United States Patent [19]

Janssen et al.

[11] Patent Number: 5,795,928
[45] Date of Patent: Aug. 18, 1998

[54] CELLULOSE ETHERS IN EMULSION POLYMERIZATION DISPERSIONS

[75] Inventors: Bernardus J. W. Janssen, Zwijndrecht; Gijsbert Kroon, Sliedrecht; Dirk Kruythoff, Papendrecht; Willemina G. Salomons, Zwijndrecht, all of Netherlands

[73] Assignee: Hercules Incorporated, Wilmington, Del.

[21] Appl. No.: 553,007

[22] Filed: Nov. 3, 1995

Related U.S. Application Data

[63] Continuation-in-part of Ser. No. 542,269, Oct. 20, 1995, abandoned, which is a continuation of Ser. No. 333,697, Nov. 3, 1994, abandoned.

[51] Int. Cl.$^6$ ................................................ C08L 3/064
[52] U.S. Cl. ............................ 524/48; 524/700; 524/733
[58] Field of Search ........................... 524/48, 700, 733

[56] References Cited

U.S. PATENT DOCUMENTS

| | | |
|---|---|---|
| 2,129,478 | 9/1938 | Rohm . |
| 2,171,765 | 9/1939 | Rohm et al. . |
| 2,508,341 | 5/1950 | Wilson . |
| 2,517,577 | 8/1950 | Klug et al. . |
| 2,618,632 | 11/1952 | Klug . |
| 2,776,273 | 1/1957 | Richard . |
| 2,839,479 | 6/1958 | Caldwell et al. . |
| 2,886,552 | 5/1959 | Heiligmann et al. . |
| 2,998,400 | 8/1961 | French . |
| 3,061,598 | 10/1962 | Cornell . |
| 3,095,398 | 6/1963 | Howland et al. . |
| 3,183,208 | 5/1965 | Jurgeleit . |
| 3,186,975 | 6/1965 | Harris . |
| 3,205,204 | 9/1965 | Heckmaier et al. . |
| 3,222,343 | 12/1965 | Ingram et al. . |
| 3,242,121 | 3/1966 | Hill, Jr. . |
| 3,290,265 | 12/1966 | Kaneko . |
| 3,357,971 | 12/1967 | Klug . |
| 3,491,039 | 1/1970 | Takahashi et al. . |
| 3,499,850 | 3/1970 | Kinzie, Jr. . |
| 3,513,120 | 5/1970 | Pohlemann et al. . |
| 3,637,563 | 1/1972 | Christens . |
| 3,642,733 | 2/1972 | Anderson et al. . |
| 3,658,772 | 4/1972 | Volk et al. . |
| 3,701,742 | 10/1972 | Richardson et al. . |
| 3,716,505 | 2/1973 | Ohe et al. . |
| 3,769,248 | 10/1973 | Kovats . |
| 3,801,519 | 4/1974 | Brodof . |
| 3,816,362 | 6/1974 | Tsuchihara et al. . |
| 3,817,896 | 6/1974 | Bergmeister et al. . |
| 3,876,596 | 4/1975 | Grubert et al. . |
| 3,917,548 | 11/1975 | Harrington . |
| 3,953,386 | 4/1976 | Murphy et al. . |
| 3,954,687 | 5/1976 | Wiest et al. . |
| 4,029,622 | 6/1977 | Keller et al. . |
| 4,031,053 | 6/1977 | Bunkley et al. . |
| 4,089,828 | 5/1978 | Vasishth et al. . |
| 4,093,776 | 6/1978 | Aoki et al. . |
| 4,226,748 | 10/1980 | Matsunaga et al. . |
| 4,228,277 | 10/1980 | Landoll . |
| 4,229,569 | 10/1980 | Feldman et al. . |
| 4,243,562 | 1/1981 | Petit . |
| 4,265,796 | 5/1981 | Mueller-Mall et al. . |
| 4,296,225 | 10/1981 | Rhum . |
| 4,352,916 | 10/1982 | Landoll . |
| 4,492,780 | 1/1985 | Zimmerschied et al. . |
| 4,540,739 | 9/1985 | Midgley . |
| 4,552,939 | 11/1985 | Tahler et al. . |
| 4,612,345 | 9/1986 | Hess . |
| 4,629,743 | 12/1986 | Hong . |
| 4,659,771 | 4/1987 | Craig . |
| 4,670,505 | 6/1987 | Craig . |
| 4,684,704 | 8/1987 | Craig . |
| 4,789,713 | 12/1988 | Sanner et al. . |
| 4,801,643 | 1/1989 | Craig . |
| 4,845,175 | 7/1989 | Lo . |
| 4,868,238 | 9/1989 | Craig . |
| 4,994,537 | 2/1991 | Craig et al. . |
| 5,130,367 | 7/1992 | Craig et al. . |

FOREIGN PATENT DOCUMENTS

| | | |
|---|---|---|
| 0213895 | 3/1987 | European Pat. Off. . |
| 0252526 | 1/1988 | European Pat. Off. . |
| 0253518 | 1/1988 | European Pat. Off. . |
| 0290771 | 11/1988 | European Pat. Off. . |
| 0290772 | 11/1988 | European Pat. Off. . |
| 0331011 | 9/1989 | European Pat. Off. . |
| 0421185 | 4/1991 | European Pat. Off. . |
| 51-61588 | 5/1976 | Japan . |
| 1253450 | 3/1969 | United Kingdom . |
| 1278813 | 8/1969 | United Kingdom . |

OTHER PUBLICATIONS

Encyclopedia of Polymer Science and Technology, vol. 13, pp. 552–571 (John Wiley & Sons, 1977).
Encyclopedia of Polymer Science and Technology, vol. 5, pp. 801–859 (John Wiley & Sons, 1977).
English Language Abstract of Japan 55–9629.
Munzer, Manfred et al., "Polymerizations in Suspension", Polymerization Processes, pp. 106–142 (Schildknecht & Skeist eds., John Wiley & Sons, 1977).
Encyclopedia of Chemical Technology, "Polymerization Mechanisms & Processes", vol. 18, pp. 720–744 John Wiley & Sons, Inc. 3rd. Ed. 1982).
English Language Abstract of Japan 51–61588.

(List continued on next page.)

*Primary Examiner*—Jeffrey T. Smith
*Attorney, Agent, or Firm*—David Edwards

[57] ABSTRACT

A process is provided for preparing an acrylic copolymer latex having improved mechanical and shear stability comprising emulsion polymerizing at least one ethylenically unsaturated monomer having up to 23 carbons in the presence of, by weight based on the total monomer content, a) from about 0.05% to about 5.0% of a protective colloid with a molecular weight of less than 75,000, and b) from about 0.01% to about 1.5% of at least one water soluble free radical polymerization initiator. This latex provides coating manufacturers the flexibility of either eliminating surfactants altogether from coating or to use small amounts thereof.

63 Claims, No Drawings

OTHER PUBLICATIONS

Craig. D.H.. "The Effect of Hydroxyethyl Content on Grafting Reactions of Hydroxyethyl Cellulose during Emulsion Polymerization of Vinyl Monomers." Polymeric Materials Science & Engineering. 53. 529 (1985).

Craig. D.H.. "Polymeric Surfactants Based on Hydroxyethyl Cellulose as Stabilizers in Emulsion Polymerization". Polymeric Materials Science and Engineering. 54 354 (1986).

Craig. D.H. "Monomer Grafting Reactions of Hydroxyethyl Cellulose in the Presence of Nonoxidizing Radical Intiatiors." Polymeric Materials Science and Engineering. American Chemical Society (ACS). vol. 54 (Apr. 1986). pp. 371–375.

Craig. D.H.. "The Synthesis of Hydroxyethtl Cellulose—Stabilized Acrylic Latexes."Polymeric Materials Science and Engineering. 51. 172 (1984).

Craig. D.H.. "The Effect of Molecular Weight on the Grafting Reactions of Hydroxyethyl Cellulose During the Emulsion Polymerization of Vinyl Monomers. "Polymeric Materials Science and Engineering. 52. 104 (1985).

*Cellulose and Cellulose Derivatives*. Part II. pp. 937–949 (Ott et al.. eds.. 2nd Ed. 1954).

CELLULOSE ETHERS IN EMULSION POLYMERIZATION DISPERSIONS

CONTINUING APPLICATION DATA

This application is a continuation-in-part of U.S. application Ser. No. 08/542,269, filed Oct. 20, 1995 now abandoned, which is a continuation of U.S. application Ser. No. 08/333,697, filed Nov. 3, 1994, and presently abandoned. These applications are incorporated herein in their entireties, by reference thereto.

BACKGROUND OF THE INVENTION

1. Field of the Invention

This invention relates to aqueous polymer dispersions derived from ethylenically-unsaturated monomers in the presence of a water soluble protective colloid and to processes for their preparation.

2. Description of Background and Other Information

In industrial emulsion polymerization processes, surfactants are commonly used either alone or in combination with polymeric protective colloids. A drawback to this is that surfactants must be used in order to obtain shear stable lattices which is not economical and may have adverse side effects. For example, the presence of surfactants in latex systems can have a negative effect on water-sensitivity and causes foaming of final products. In addition, at conventional use levels, surfactants do not impart sufficient mechanical stability to the final products.

It is known in the prior art that the presence of protective colloids as co-stabilizers, such as hydroxyethylcellulose (HEC) and poly(vinyl alcohol) (PVOH), in emulsion polymerization of ethylenically-unsaturated monomers, including vinyl monomers, vinyl monomers with an acrylic monomer such as acrylic esters, methacrylic esters or mixtures thereof, provides lattices of submicron particle size with improved rheological, stability, and performance characteristics. These aqueous polymer dispersions are useful in the manufacture of latex paints, binders for non-woven materials, water-based inks, paper coatings and water-borne adhesives such as pressure sensitive adhesives.

In emulsion polymerization processes of monomers comprising acrylics or styrene either alone or in combination with other monomers, it is not always possible to use protective colloids such as cellulosics or PVOH, as co-stabilizers. When prior art protective colloids are used in an acrylic- or styrene-based latex systems, a high degree of flocculation occurs which manifests itself in a lack of mechanical stability. This flocculation results from the high tendency of the protective colloid to be incorporated directly into the reacting polymer chain. This phenomenon is commonly known as grafting.

It should be understood that grafting in and of itself is not to be totally eliminated. A minor amount of grafting does not cause flocculation; further, it improves stability of latex systems, as has been known for a long time for the vinylacetate copolymer lattices. It is the combination of excessive grafting and the possibility of interparticle bridging that are the causes for coagulation. Interparticle bridging is not only determined by the amount of grafted material or particle size alone, but is also dependent on the amount of water soluble polymer present in the water phase, the molecular weight of the protective colloid, solids content, etc.

In any event, depending on the particular latex system, the lack of mechanical stability may be overcome by using high levels of surfactant alone or in combination with protective colloid. For example, in vinyl acetate-based systems, high levels of protective colloid are used in combination with surfactant, while in acrylic-based systems, high levels of surfactant are used alone. However, lattices prepared with such high levels of surfactants have the performance problems described above.

Thus, a need exists in the industry to overcome the inherent drawbacks in prior art latex systems related to the use of high levels of surfactant or prior art protective colloids.

The approach as set forth in CRAIG '704, U.S. Pat. No. 4,684,704, is to use from about 0.01% to about 1.7%, by weight based on the total monomer content, of a hydrophobically-modified hydroxy ethyl cellulose (HMHEC) that is readily and successfully incorporated into the dispersions or lattices by the emulsion polymerization of monomers having a low protective colloid-grafting potential. The resultant lattices have a particle size of less than 1.0 micron and excellent mechanical stability.

Another approach for polymerizing acrylic monomer systems, disclosed in LO, U.S. Pat. No. 4,845,175, is to use 0.02 to 2.0% by weight of a hydrophobically modified hydroxyethylcellulose as a protective colloid.

Yet another approach for polymerizing acrylic monomer systems, disclosed in CRAIG '771, U.S. Pat. No. 4,659,771, is to use, in addition to a protective colloid, from about 0.1% to 5% by weight of a substantially completely water soluble conjugated unsaturated monomer such as furoic acid, styrene sulfonic acid, and metal salts, amine salts, ammonium salts and quaternary salts of rosin and acids having 4 to 36 carbon atoms.

SUMMARY OF THE INVENTION

The present invention is directed to a process for preparing a latex having improved mechanical stability comprising emulsion-polymerizing at least one ethylenically unsaturated monomer in the presence of, by weight based on the total ethylenically unsaturated monomer content, an effective amount of a polymer which is a protective colloid with a molecular weight of less than about 75,000 selected from the group consisting of polysaccharides, poly(acrylic acid) and salts thereof, partially and fully hydrolyzed poly(vinyl alcohol), polyacrylamide, poly(vinyl pyrrolidone), poly(vinyl ethers), gelatin, casein and derivatives and mixtures of the group.

The present invention is further directed to a latex system which comprises an aqueous emulsion of a polymer of the at least one ethylenically unsaturated monomer, and further including the indicated protective colloid.

DESCRIPTION OF THE INVENTION

It has been unexpectedly found that the use of low molecular weight protective colloid in emulsion polymerization of ethylenically-unsaturated monomers produces excellent mechanical stability of the resultant polymer. The upper limit of the molecular weight of the protective colloid is about 75,000, preferably about 50,000, and most preferably about 20,000. The lower limit of the molecular weight of the protective colloid is about 5,000, preferably about 10,000, and most preferably about 15,000.

The present invention is particularly useful for acrylic or styrene latex systems. As noted above, with regard to prior art acrylic or styrene based latex systems, the use of commercially desirable levels of protective colloid is not practical because of high levels of flocculation occurring. The use of high levels of surfactant to overcome this problem can have a negative effect on water sensitivity and causes foaming of final products. In addition, at conventional use levels, surfactants do not impart sufficient mechanical stability to the final products. It has unexpectedly been found that the use of low molecular weight protective colloid, in acrylic- or styrene-based latex system, permits reduction in the level of—or even the omission of—surfactant. The final products have generally been found to have less water sensitivity, less foaming, and greater mechanical stability properties as compared to the prior art systems. Mechanical stability can manifest itself in greater shelf life. Additionally, in paint applications there is a reduced tendency to sag, and an improved leveling.

The preferred polysaccharide protective colloid is a water soluble cellulose ether which has been derivatized with ethylene oxide, methylchloride, propyleneoxide, monochloracetic acid, etc., or mixtures thereof. Particularly preferred are carboxymethylcellulose (CMC) and derivatives thereof, having a carboxyl degree of substitution (DS) of about 0.7 to about 2.9, more preferably about 0.7 to about 1.5, still more preferably about 1.0 to about 1.4. Suitable carboxymethylcellulose derivatives include methyl carboxymethylcellulose, ethyl carboxymethylcellulose, hydroxyethyl carboxymethylcellulose, hydroxypropyl carboxymethylcellulose, methoxyethyl carboxymethylcellulose, ethoxyethyl carboxymethylcellulose, and diethyl aminocarboxymethylcellulose.

Hydroxyethylcellulose (HEC) can also be used, the hydroxyethyl molar substitution (MS) preferably ranging from about 1.6 to about 4.0, more preferably about 1.8 to about 3.5, still more preferably between about 1.8 and about 2.9.

Yet additionally, hydrophobically modified cellulose ethers can be used. Suitable hydrophobically modified cellulose ethers are cellulose ethers which are further substituted with a hydrocarbon having from 4 to 25 carbon atoms, in an amount by weight of the hydrophobically modified cellulose ether from about from about 0.1% to about 3.0%, more preferably about 0.1% to about 2.0%.

A preferred hydrophobically modified cellulose ether is hydrophobically modified hydroxyethylcellulose (HMHEC). Hydrophobically modified hydroxyethylcellulose useful in the practice of this invention is a hydroxyethylcellulose which is further substituted with a hydrocarbon having from 4 to 25 carbon atoms, in an amount by weight of the hydrophobically modified hydroxyethylcellulose from about 0.1% to about 3.0%, more preferably about 0.1% to about 2.0%. The hydroxy ethyl MS of the HMHEC lies preferably in the range of about 2.9 to about 4.0, more preferably about 2.9 to about 3.5.

Other cellulose ethers, for example, that can be used in this invention as a protective colloid are ethyl hydroxyethylcellulose (EHEC), methylcellulose (MC), methyl hydroxypropylcellulose (MHPC), and hydroxypropylcellulose (HPC).

Other polysaccharides and materials that can be used as protective colloids in the present invention are ethoxylated starch derivatives, partially and fully hydrolyzed poly(vinyl alcohol), poly(acrylic acid), alkali metal (potassium, sodium, etc.) polyacrylates, polyacrylamide, poly(methyl vinyl ether-maleic anhydride), poly (vinyl pyrrolidone), water soluble starch glue, gelatin, water soluble alginates, casein, agar, and natural and synthetic gums.

Protective colloid is preferably employed in an amount effective for stabilization of the latex system of the invention. In this context, an effective amount is the amount which serves to stabilize the latex system during the aqueous emulsion polymerization, and after completion of the polymerization.

Particularly, the protective colloid concentration in the emulsion polymerization process of the present invention can be varied over a wide range, with the upper limit being determined only by economical and practical considerations based on what properties are desired in the final product. It is preferred that the upper limit be about 5.0%, more preferably 3.5%, and most preferably about 2.5%, by weight based on the total ethylenically unsaturated monomer content in the reaction mass. The preferred lower limit is about 0.005%. A more preferred lower limit is about 0.05%, with about 0.1% by weight, based on the total weight of the ethylenically unsaturated monomer content, being the most preferred lower limit.

The protective colloid of the invention can be used either alone or in combination with other protective colloids or surfactants. For example, the CMC derivative can be used as a single stabilizer or in combination with one or more surfactants. CMC as used in this invention is available under the trademark "Ambergum" water soluble polymers, types 1221 and 3021, marketed by Aqualon Company, Wilmington, Del. A suitable hydrophobically modified hydroxyethylcellulose is available under the trademark "Natrosol Plus", marketed by Hercules Incorporated, Wilmington, Del.

Also, in accordance with this invention, the monomers that are used in this invention are at least one ethylenically unsaturated monomer such as vinyl esters or ethers, styrenes, and others. The acrylates that are used in this invention are acrylic acid, methacrylic acid, butyl acrylate, methyl methacrylate, and other acrylate or methacrylate esters.

In general, any ethylenically unsaturated monomer, which optionally may be cyclic, which can be polymerized by free radical initiation can be used in the practice of this invention. Preferred ethylenically unsaturated monomers include those having up to 23 carbons.

Examples of suitable monomers include vinyl esters, vinyl ethers, vinyl and vinylidene halides, N-vinyl pyrrolidone, ethylene, $C_3$ or greater alpha-olefins, allyl amines, allyl esters of saturated monocarboxylic acids, and amides thereof and dienes and derivatives thereof.

Suitable vinyl esters include aliphatic vinyl esters, such as vinyl formate, vinyl acetate, vinyl propionate, vinyl butyrate, vinyl isobutylrate, vinyl valerate, vinyl caproate and vinyl versatate.

Typical vinyl ethers include methylvinyl ether, ethylvinyl ether and n-butylvinyl ether.

Suitable $C_3$ or greater alpha-olefins include propylene, 1-butene, 1-pentene, cyclopenene, 1-hexene, cyclohexene and 1-decene.

Allyl amine and N-substituted allyl amines are examples of typical allyl amines.

Suitable dienes are butadiene, cyclopentadiene, and dicyclopentadiene.

Suitable allyl esters of saturated monocarboxylic acids may include allyl acetate, allyl propionate and allyl lactate, and their amides, among others.

The polymers of the invention can be prepared from one or more of the ethylenically unsaturated monomers. In this regard, it is noted that by the term "polymer" it is also meant homopolymers, and copolymers that are polymerized with two or more different monomers.

For acrylic and styrene based lattices, low molecular weight CMC is preferred. For the vinylacetate-acrylate systems, low molecular weight HMHEC is used preferentially, but also low molecular weight HEC and low molecular weight CMC can be used. When acrylic acid, or methacrylic acid is used in the polymerization, the use level preferably is about 0.005% to about 2%—more preferably, about 0.05% to about 1%—by weight based on the total ethylenically unsaturated monomer content.

Polymers of the invention with relatively high glass transition temperatures—e.g., about 50° C. to about 150° C.—can be characterized as "hard"; those with relatively low glass transition temperatures—e.g., about 100° C. to about −3° C. —can be characterized as "soft". A factor affecting the degree of hardness and softness is the identity of the ethylenically unsaturated monomers which are employed.

Different of the ethylenically unsaturated monomers contribute to hardness or softness in different degrees, and are thusly known as "hard" and "soft" monomers. The relative hardness and softness of different monomers is known in the art. The degree of hardness or softness of a polymer is accordingly affected by the hardness or softness of the monomers comprising the polymer, and by the relative ratios of these monomers.

When making a co-polymer latex system, the ratios of "hard" to "soft" monomer are chosen so that a continuous latex film is formed at use temperature. Styrene-acrylics can be made in the range containing from about 0.005% to about 70% by weight styrene in the formed copolymer. Vinyl-acrylates can be made in the ratio range of about 1:1 to about 10:1, preferably about 7:3 to about 9:1, by weight of vinylacetate/acrylate monomer.

The resultant dispersions prepared in accordance with this invention impart significant improvement to the scrub resistance of latex paints formulated with them. The latex paints include gloss and flat paints—gloss latex paint having a pigment volume concentration of less than about 50, and flat latex paint having a pigment volume of about 50 or greater.

Anionic, cationic, nonionic, and amphoteric surfactants and mixtures thereof known in the art may be used in the practice of this invention. Suitable surfactants include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-50}$ alkyl phenols and their sulfonation products, such as nonylphenol ethoxylate with 4–50—more preferably, 10–20— ethylene oxide units, ethoxylated $C_{4-50}$ alkanols and their sulfonation products, and also sulfosuccinic acid esters such as sodium dioctylsulfosuccinate; these surfactants or emulsifiers are optional and are not always required, but when they are used, they are present in amounts usually of from 0.1 to 5.0%, preferably 0.1 to 2.0%, by weight, based on the total amount of the ethylenically unsaturated monomers present in the process.

Any known methods of emulsion polymerization may be used, including batch, semi-batch, or continuous and thermal or redox techniques. Semi-batch monomer addition with either batch or continuous addition of the initiator or catalyst is preferred. The polymerization can also be carried out under high shear, meaning that, for example, a loop-reactor can be used for performing the reaction. Preferably, an amount of from about 0% to about to 40%—more preferably about 1% to about 25%, and most preferably from about 5% to about 15%—by weight of the ethylenically unsaturated monomer or monomers is added in the initial charge to the reactor. Also as a matter of preference, an amount of from about 0% to about 60%—more preferably, about 50% to about 60%—by weight of the initiator is added in the initial charge to the reactor. The continuous addition of any reaction ingredient or ingredients is generally done over a period of from about 2 to about 5 hours. The batch or delayed initiator or catalyst addition may be used, although these variations are not necessary for the success of this invention.

In general, the monomers are polymerized by aqueous emulsion techniques at from about 20° C. to about 120° C., preferably from about 45° C. to about 95° C., in the presence of a free radical polymerization initiator, particularly a water soluble peroxide, e.g., hydrogen peroxide, persulfates such as potassium, sodium and ammonium persulfates or, in some cases, perborates. Other methods known in the art may also be used to polymerize monomers, such as, for example, by using redox polymerization catalyst systems, such as potassium persulfate and sodium bisulfite. The initiator is used at a concentration of 0.2–2.0% by weight based on the weight of the monomer(s), preferably in an amount of 0.3–1.0%.

The resulting product of the invention is a latex system, including particles of the thusly prepared polymer dispersed as a discontinuous phase in an aqueous continuous phase, and also including the protective colloid. The indicated particles preferably have an average size of less than about 500 nanometers—more preferably less than about 300 nanometers, and still more preferably less than about 200 nanometers.

The latex system of the present invention has excellent shear stability. Consistent with the previous discussion herein, it may be employed in latex paint compositions. These paint compositions preferably further include at least one of a pigment and an extender; yet additional components conventional for latex paint formulations, including thickeners, can be employed.

Further, the latex system of the present invention may be employed in water-based ink compositions, paper coating compositions, binders for non-woven materials, and adhesive compositions—particularly dextrin free adhesive compositions.

All parts and percentages used in this specification are by weight unless otherwise indicated.

The invention is illustrated by the following Examples, which are provided for the purpose of representation, and are not to be construed as limiting the scope of the invention.

EXAMPLES

Mw was determined by high performance size-exclusion chromatography (SEC) method as follows:

Apparatus

A Varian 5010 LC equipped with a Waters Associates R401 differential refractometer and a Kepp and Zonen, model BD 40, recorder was used for the SEC analyses. A Rheodyne, model 5302, 3-way toggle valve was installed between the sample exit and reference inlet lines to allow for periodic flushing of the reference side of the cell. However, during analysis, the reference side of the refractometer contained stationary mobile phase. Injections were made using a model 7010 Rheodyne Valve equipped with a 50 µl sample loop.

Chromatographic Columns

The SEC columns were purchased from SynChrom, Inc. (Linken, Ind.) and contained a glycerylpropyl chemicallybonded phase on silica. The column set used consisted of a GPC 100 Å(pore size) guard column (5 cm×4.1 mm I. D. Lot no. 227904), two GPC 100 Åanalytical columns (25 cm×4.6 mm I. D. , lot nos. 222033, 49201), and a GPC 1000 Åanalytical column (25 cm×4.6 mm I. D., lot no. 48205). The columns were connected in series as listed.

Mobile Phase Preparation

The mobile phase used in the analyses was 0.7M ionic-strength acetate buffer solution of pH 3.7. The pH 3.7 mobile phase was prepared by first adding 60 ml of 4M sodium acetate and 440 ml of 4M acetic acid to a one liter volumetric flask and filling to volume with distilled, deionized water. This provided a 0.24M ionic-strength buffer at pH 3.7. The ionic-strength of this solution was then increased to 1.44M by adding 0.4 moles of sodium sulfate to 1l of the 0.24M acetate solution. The 1.44M ionic-strength solution was used during the sample preparations to minimize mobile phase mismatch. The final mobile phase was prepared by diluting the 1.44M double-strength solution 1:1 with distilled deionized water and filtering through a 0.22 μm type-GS Millipore membrane.

Sample Preparation

All of the samples were prepared by dissolving 0.150 g polymer (solids basis-corrected for moisture content) in distilled, deionized water to a total volume of 25 mls yielding an initial concentration of 6 mg/mil. These aqueous solutions were then diluted 1:1 with 1.4M double strength acetate buffer solution to a concentration of 3 mg/ml, approximately matching the mobile phase composition. All of the sample solutions were filtered through a 0.45 μm Millex-HV disposable filter unit (from Millipore) prior to injections.

Analysis Conditions

Column Set:
  GPC 100 Åguard, 100 Å, 100 Å, 1000 Å(Synchropak)
Mobile Phase:
  0.7 M, pH 3.7 acetate buffer
Flow Rate:
  0.5 ml/min. (0.51 ml/min measured)
Pressure:
  ~135–140 ATM
Chart Speed:
  1 cm/min.
Sample Conc:
  1.5–2.0 mg/ml
DRI Attenuation:
  2×

Multiple injections of each sample were made using the above conditions. Overlay tracings of the resultant SEC chromatograms were prepared for comparison of standard Mw.

Calibration

A series of dextran standards of various Mw from American Polymer Standards Corporation (DXTKIT) was analyzed using the preceding volume (distance). The lowest molecular weight standard (DXT-180 Mw), which essentially eluted at the total permeation limit, was also used as the internal standard.

Average Molecular Weight Mw Determination Method

Example 1

All-Acrylics Stabilized With Low Molecular Weight CMC

This Example illustrates one embodiment of the aqueous dispersions of this invention and how to prepare the same.

The polymerizations were carried out in a 2 liter glass reaction vessel which was equipped with a thermocouple, a reflux condenser, a monomer inlet, an initiator inlet and a half moon shaped stirrer. 16.6 grams of the protective colloid (carboxymethylcellulose (CMC), marketed under the trademark Ambergum 3021, with weight average molecular weight (Mw) being about 7,000 to 11,000 and a carboxyl degree of substitution of approximately 1.2, available from the Aqualon Company, with a solution concentration of 29.6% having a Brookfield viscosity of 630 mPa.s at 25° C.), together with 1.6 grams of sodium bicarbonate, were dissolved in 461 grams of demineralized water. After complete dissolving, the temperature was raised to 85° C. by means of a waterbath. Next, 40% of the initiator solution (1.5 grams potassium persulfate in 50 grams demineralized water) was evenly added in 30 seconds. One minute later, the addition of the monomer was started. The monomer mixture (248.6 grams of butyl acrylate, 248.6 grams of methyl methacrylate and 2.8 grams of methacrylic acid) was metered with an addition speed of initially 54.5 grams per hour and this speed was gradually increased to 163.5 grams per hour in the first hour of reaction. When the temperature had returned to 85° C., the metering of about 95% of the rest of the initiator solution followed, with the remaining 5% of the initiator solution being held back and added after all the monomer was metered. Addition of the indicated 95% of the rest of the initiator was effected over the same time period as the monomer, with the speed of initiator addition being adjusted to the monomer addition speed, so that the addition of the monomer and the indicated 95% of the rest of the initiator was concluded simultaneously. Both the monomer and the initiator were added over a 3.5 to 4 hour period, with a plunger pump and a peristaltic pump, respectively.

The reaction temperature was held at 85° C. The polymerization was terminated by keeping the temperature at 85° C. for 1 hour after the addition of the initiator and monomer. Hereafter, the resulting lattices were cooled to room temperature. Stirring speed was 200 rpm during the reactions.

Comparative Example A

All-Acrylics Stabilized with High Molecular Weight CMC

This Comparative Example illustrates the need for the low molecular weight of the protective colloid. The formulation and procedure were used as described in Example 1, except for the following changes: instead of using 16.6 grams of Ambergum® 3021 product, 10 grams of CMC 12M8P (Brookfield viscosity 430 mPa.s (2% solution at 25° C.)) with Mw being about 300,000 were used. The amount of demineralized water had to be adjusted in this case to 473 grams in order to arrive at the same solids content of the resulting latex.

Comparative Example B

All-Acrylics Stabilized with Nonionic Surfactant

This Comparative Example illustrates the high amount of nonionic surfactant necessary for obtaining shear stable lattices and serves as a comparison for the invention. The formulation and procedure of Example 1 were used except that instead of using 16.6 grams of protective colloid, 20 grams of a nonionic surfactant (nonylphenolethoxylate with 10 ethylene oxide units: Intrasol NP10, 100% active material, from Stockhausen) were dissolved in 433 grams of demineralized water.

Comparative Example C

All-Acrylics Stabilized With Both Anionic and Nonionic Surfactant

This Comparative Example illustrates the need for a high amount of surfactant in all-acrylic lattices without the use of a protective colloid in order to obtain shear stable lattices. The formulation and procedure of Example 1 were used except that instead of using 16.6 grams of protective colloid, 10 grams of a nonionic surfactant (nonylphenolethoxylate with 10 ethylene oxide units: Intrasol NP10, 100% active material) together with 10 grams of an anionic surfactant (dioctylsulfosuccinate: Aerosol OT-75, 75% active material, from Cyanamid) were dissolved in 472 grams of demineralized water.

Example 2

Surfactant Free, Styrene-Acrylics Stabilized With Low Molecular Weight CMC

This Example illustrates another embodiment of the invention. The polymerizations were carried out in a 2 liter glass reaction vessel which was equipped with a thermocouple, a reflux condenser, a monomer inlet, an initiator inlet and a half moon shaped stirrer. 33 grams of the protective colloid (Ambergum® 3021 CMC, with a solution concentration of 29.6% having a solution viscosity of 630 mPa.s at 25° C.) and 1.6 grams of sodium bicarbonate were dissolved in 450 grams of demineralized water. After completely dissolving, the temperature was raised to 85° C. by means of a water bath. Next, 40% of the initiator solution (1.5 grams potassium-persulfate in 50 grams demineralized water) was evenly added in 30 seconds. One minute later, the addition of the monomer was started. The monomer mixture (245 grams of butyl acrylate, 245 grams of styrene and 10 grams of methacrylic acid) was added initially at speed of 54.5 grams per hour; this speed was gradually increased to 163.5 grams per hour in the first hour of reaction. The rest of the polymerization procedure was the same as described in Example 1.

Comparative Example D

Styrene-Acrylics Stabilized With Anionic and Nonionic Surfactant

This Comparative Example illustrates the need for low molecular weight CMC as a stabilizer at low surfactant concentrations to obtain stable lattices. The formulation and the procedure described in Example 2 were used with the exceptions that instead of 33 grams of the protective colloid, 15 grams of an anionic surfactant (alkylarylethersulfate: Disponil AES 60; 33% active material, from Henkel GmbH, Dusseldorf, Germany) together with 5 grams of nonionic surfactant (nonylphenolethoxylate with 10 ethylene oxide units: Intrasol NP10, 100% active material) were used in 463 grams of water. The monomer mixture was in this case 248.6 grams of butylacrylate, 248.6 grams of styrene and 2.8 grams of methacrylic acid.

Example 3

Styrene-Acrylics Stabilized With Both Surfactants and Low Molecular Weight CMC The formulation and the procedure described in Example 2 were used with the exception that in addition to the Ambergum® solution, also 15 grams of an anionic surfactant (alkylarylethersulfate: Disponil AES 60; 33% active material) and 5 grams of an nonionic surfactant (nonylphenol-ethoxylate with 10 ethylene oxide units: Intrasol NP10; 100% active material) were used in 450 grams of water for the stabilization.

Example 4

Styrene-Acrylics Stabilized With Both Surfactants and Low Molecular Weight CMC The formulation and the procedure described in Example 2 were used with the exception that instead of using 33 grams, 16.6 grams of Ambergum® 3021 product were used in conjunction with 5.9 grams of anionic surfactant (sodium dicyclohexyl sulfosuccionate: Aerosol A196, 85% active material), 5 grams of nonionic surfactant (nonylphenolethoxylate with 4 ethylene oxide units: Surfonic N40 (100% active material) were used in 463 grams of water. The monomer mixture was in this case 248.6 grams of butyl acrylate, 248.6 grams of styrene and 2.8 grams of methacrylic acid. The amount of initiator was increased in order to improve monomer conversion, but was still at a low level. The initiator solution contained 3 grams of potassium persulfate in 100 grams of water.

Example 5

Vinyl Acetate-Acrylics With Low Molecular Weight CMC

This Example illustrates the possibility of making surfactant free vinyl acrylic dispersion with a relatively high amount of butyl acrylate in the monomer composition.

The polymerizations were carried out in a 2 liter glass reaction vessel which was equipped with a thermocouple, a reflux condenser, a monomer inlet, an initiator inlet, and a half moon shaped stirrer. 33 grams of the protective colloid (Ambergum® 3021 CMC solution, with a solution concentration of 29.6% having a Brookfield viscosity of 630 mPa.s at 25° C.) together with 2.0 grams of sodium bicarbonate were dissolved in 397 grams of demineralized water. After completely dissolving, the temperature was raised to 80° C. by means of a waterbath.

Next, 40% of the initiator solution (1.5 grams of potassium persulfate in 50 grams of demineralized water) was evenly added in 30 seconds. One minute later, the addition of the monomer was started. The monomer mixture (350 grams of vinylacetate and 150 grams of butylacrylate) was added initially at a speed of 54.5 grams per hour and this speed was gradually increased to 163.5 grams per hour in the first hour of reaction. As the temperature reached 80° C. again, the metering of 95% of the rest of the initiator solution followed. The remaining 5% of the initiator solution was kept back and was added after all the monomer was metered. The initiator was added over the same time period as the monomer and the speed of initiator addition was adjusted to the monomer addition speed. Both the monomer and the initiator were added over a 3.5 to 4 hour period, with a plunger pump and a peristaltic pump, respectively. The reaction temperature was kept at 80° C. The polymerizations were terminated by keeping the temperature at 80° C. for 1 hour after the addition of the initiator and monomer. Thereafter, the lattices were cooled to room temperature. Stirring speed was 200 rpm during the reaction.

Example 6

Vinylacetate-Acrylics With Both Surfactant and Low Molecular Weight CMC

The formulation and procedure used in this Example were the same as described in Example 5 with the following changes: Instead of using 33 grams of Ambergum® 3021 CMC, 67 grams of the Ambergum® 1521 product (14.7% solution concentration, Brookfield viscosity at 25° C.: 1540 mPa.s with Mw being about 35,000 to 50,000, and a carboxyl degree of substitution of approximately 1.2) together with 17 grams of anionic surfactant (sulfated nonylphenolethyoxylate with 30 ethylene oxide units: Fenopon EP 120; 30% active material) and 7.1 grams of a nonionic (nonylphenolethoxylate, Antarox CO 897, 70 % active material) were dissolved in 363 grams of demineralized water. The rest of the formulation was the same as in Example 4.

Example 7

Vinylacetate-Acrylics With Both Surfactant and Low Molecular Weight CMC

The formulation and procedure used in this Example were the same as used in Example 5 except that in this case also surfactants were added: the protective colloid and the buffer were dissolved in 397 grams of water together with 5 grams of nonionic surfactant (nonylphenol-ethoxylate with 20 ethylene oxide units: Tergitol NP40; 100% active material) and 17 grams of anionic surfactant (sulfated nonylphenolethoxylate with 30 ethylene oxide units: Fenopon EP 120; 30% active material).

Example 8

Vinylacetate-acrylics With Both Surfactant and Low Molecular Weight HEC

The formulation and procedure used in this Example were the same as described in Example 1 except for the following changes: 12.5 grams of a mixed anionic surfactant (Disponil MGS 156, active material: 40%), together with 7.1 grams of a nonionic (nonylphenolethoxylate, Antarox CO 897, 70% active material), 33 grams of low molecular weight HEC (29.1% solution concentration, Brookfield viscosity of 260 mPa.s at 25° C.) with Mw being about 7,000 to about 11,000 and 2.8 grams of sodium bicarbonate were dissolved in 397 grams of demineralized water. Reaction temperature was 80° C. and the monomer mixture comprised 350 grams of vinyl acetate and 150 grams of butyl acrylate.

Example 9

Vinylacetate-acrylics With Both Surfactant and Low Molecular Weight HMHEC (Invention)

The formulation and procedure used were the same as described in Example 8, except that no low molecular weight CMC was used, but rather 47.4 grams of low molecular weight Natrosol Plus HMHEC (solution concentration 21.1% having a Brookfield viscosity of 28.5 mPa.s at 25° C.). The weight average molecular weight of this protective colloid is about 25,000. The amount of water, therefore, had to be adjusted in order to arrive at the same solids content as the latex. Surfactants, buffer (in this case 2.0 grams) and protective colloid were dissolved in 383 grams of demineralized water.

Example 10

Vinylacetate-acrylics With Both Surfactant and Low Molecular Weight HMHEC

The formulation and procedure used were the same as described in Example 8 , except that no low molecular weight CMC was used, but rather 10 grams of low molecular weight Natrosol Plus HMHEC (2% solution viscosity of 4 mPa.s at 25° C. with Mw being about 25,000). The amount of water, therefore, had to be adjusted. Surfactants, 2.0 grams of the buffer, and protective colloid were dissolved in 383 grams of demineralized water.

Comparative Example E

Vinylacetate-Acrylics Stabilized With Surfactants

The formulation and procedure used in this Example were exactly the same as the ones used in Example 9, with the exception that no protective colloid was used, the surfactant mixture and the buffer were, therefore, dissolved in 420 grams of water. As can be seen, monomer conversion is worse when only surfactants are used and the latex has a very low viscosity.

Example 11

Vinylacetate-ethylene Stabilized With Surfactant and Low Molecular weight CMC

The polymerization was carried out in a 2 liter stainless steel reaction vessel that was equipped with a thermocouple, a monomer inlet, initiator inlet, and a stirrer. 33 grams of the protective colloid (Ambergum® 3021 CMC, with a solution concentration of 29.6% having a solution viscosity of 630 mPa.s at 25° C.) and 1.25 grams of sodium bicarbonate were dissolved in 337 grams of demineralized water. Next to this, 21.5 grams of 100% active EHSS (bis(ethylhexyl)sulfo succinate sodium salt) and 3.6 grams Antarox CO 897 material (nonylphenol 40EO) were added. After completely dissolving, the temperature was raised to 80° C. Next, 15% of the initiator solution (2.5 grams potassium persulfate in 100 grams demineralized water) was evenly added in 30 seconds.

One minute later, the addition of the monomer and the rest of the initiator solution was started. 445 grams of vinyl acetate were gradually added over a period of 120 minutes, keeping the ethylene pressure on the reaction vessel at 21 bars. The initiator was added over the same time period as the monomer. The reaction temperature was kept at 80° C. The polymerization was terminated by keeping the temperature at 80° C. for 1 hour after the complete addition of the initiator and monomer. Thereafter the lattices were cooled to room temperature.

Example 12

Vinylacetate-Butylacrylate Stabilized With Surfactants and Low Molecular Weight CMC; Polymerization at High Shear This Example illustrates the possibility for using high shear in the reaction when a low molecular weight protective colloid is applied.

The formulation and procedure used in this example were the same as the ones described in Example 5, except that in this Example a mixture of 12.5 grams of an anionic surfactant (Disponil MGS 156, active material: 40%), 7.1 grams of a nonionic surfactant (nonylphenolethoxylate, Antarox CO 897, 70% active material), 33 grams of the protective colloid (Ambergum® 3021 CMC, with a solution concentration of 29.6% having a Brookfield viscosity of 630 mPa.s at 25° C.), and 2.0 grams of sodium bicarbonate were dissolved in 397 grams of demineralized water. The stirring speed in this Example was 400 rpm (tip speed 2.72 m/s).

Example F

Vinylacetate-Butylarylate Stabilized With Surfactants; Polymerization at High Shear This Comparative Example illustrates the need for a protective colloid in the polymerization when high shear is applied.

The formulation and procedure used in this Example were the same as the ones already described in Example 5, except that in this Example a mixture of 12.5 grams of an anionic surfactant (Disponil MGS 156, active material: 40%), 7.1 grams of a nonionic surfactant (nonylphenolethoxylate, Antarox CO 897, 70% active material), and 2.0 grams of sodium bicarbonate were dissolved in 420 grams of demineralized water. The stirring speed in this Example was 400 rpm (tips speed 2.72 m/s).

Example 13

All-Acrylic Latex Having a Low Minimum Film Formation Temperature and Stabilized with CMC The polymerization was carried out as described in Example 1, except for the following changes. Instead of 16.6 grams of Ambergum® 3021 CMC, 33 grams of Ambergum® 3021 CMC were dissolved together with 6.25 grams of dihexylsulfosuccinate (Disponil SUS IC 680, 80% active material), 5 grams of nonylphenolethoxylate with 4 ethylene oxide units (Surfonic N40, 100% active material), and 1.6 grams of sodium bicarbonate in 450 grams of demineralized water. The monomer mixture used comprised of 200 grams of methyl methacrylate, 300 grams of butylacrylate, and 2.8 grams of methacrylic acid.

Example G

All-Acrylic Latex Having a Low Minimum Film Formation Temperature and Stabilized with Surfactants The polymerization of this Comparative Example was carried out as described in Example 13, except that no Ambergum® polymer was used for stabilization. The surfactants and buffer were, therefore, dissolved in 473 grams of water.

Example 14

Vinylacetate-Acrylic Latex Having a Low Minimum Film Formation Temperature and Stabilized with Ultra Low Molecular Weight HMHEC The polymerization was carried out as described in Example 10, except for the following changes. 12.7 grams of a mixed anionic surfactants (Disponil MGS 156, active material 40%), 7.7 grams of an ethoxylated fatty alcohol (Disponil APE 257, 65% active material), 1.6 grams of sodium bicarbonate, and 10 grams of low molecular weight Natrosol Plus HMHEC were dissolved in 422 grams of demineralized water. The monomer mixture contained 200 grams of vinyl acetate and 300 grams of butyl acrylate.

Example 15

Vinylacetate/Veova-10 Latex Having a Medium Minimum Film Formation Temperature and Stabilized with CMC The polymerization was carried out in a 2 liter glass reaction vessel, which was equipped with a thermocouple, a reflux condenser, a monomer inlet, an initiator inlet, and a half moon shaped stirrer.

40 grams of the protective colloid (Ambergum® 3021 CMC, with a solution concentration of 29.6% having a Brookfield viscosity of 630 mPa.s at 25° C.) together with 1.6 grams of sodium bicarbonate, 7.5 grams of dihexylsulfosuccinate (Disponil SUS IC 680, 80% active material), and 6 grams of a nonionic surfactant (ATPOL E 5720) were dissolved in 432 grams of demineralized water. After completely dissolving this mixture, the temperature was raised to 80° C. in a waterbath. Next, 5% of the total amount of monomer was added during 1 minute. After 2 minutes, 25% of the initiator solution (1.8 grams potassium persulfate in 60 grams demineralized water) was added. When the temperature had reached 72° C. again, the addition of the monomer was started. The monomer mixture (300 grams of vinylacetate, 300 grams of VeoVa-10 monomer was metered at an addition speed of 180 grams per hour. VeoVa is a trademark under which vinyl versatate products are marketed by Shell Chemical Company. After 5 minutes, the temperature was raised to 80° C. and maintained at this temperature. The flow of the initiator solution was adjusted to the flow of the monomer. Stirring speed of the stirrer was 200 rpm during the reaction. The polymerization was terminated by keeping the temperature at 80° C. for 1 hour after the addition of the initiator and monomer. Thereafter, the polymerized mass was cooled to room temperature.

Example H

Vinylacetate/VeoVa-10 Latex Having a Medium Minimum Film Formation Temperature and Stabilized With Surfactants The polymerization of this Comparative Example was carried out according to Example 15 with the exception that no protective colloid was used. The amount of water had, therefore, to be adjusted to 460 grams.

Example 16

Methyl Methacrylate/VeoVa-9 Butyl Acrylate Latex Stabilized With CMC and Surfactants The polymerization was carried out according to Example 13 with the exception that the monomer mixture contained 100 grams of methyl methacrylate, 100 grams of VeoVa-9 monomer, 300 grams of butyl acrylate, and 2.8 grams of methacrylic acid.

Example 17

Methyl Methacrylate/VeoVa-9/Butyl Acrylate Latex Stabilized With CMC Without Surfactants The polymerization was carried out according to Example 16, except that the surfactants were omitted.

Example 18

Methylmethacrylate/Butylacrylate Latex Stabilized With Ultra Low Molecular Weight Hydroxypropylcellulose The polymerization was carried out using the procedure as described in Example 1. As a protective colloid, 16.5 grams of a 30% solution of ultra low molecular weight hydroxypropylcellulose (Mw of 6500) having a cloud point higher than 90° C. were used instead of 16.6 grams of Ambergum® 3021 CMC.

The properties of the lattices of the foregoing examples and comparative examples are set forth below in Tables 1 and 2.

TABLE 1

| Example | Solids (wt. %) | grit pm | pH | PS[1] (nm) | Shear Stability[2] (min.) |
|---|---|---|---|---|---|
| 1 | 48.8 | 200 | 6.4 | 310 | >5 |
| A | Coagulated | | | | |
| B | 46.2 | 70 | 6.3 | n.d. | >5 |
| C | 48.0 | 80 | 6.5 | <100 | <1 |
| 2 | 46.9 | 9900 | 5.8 | 220 | <1 |
| D | Coagulated | | | | |
| 3 | 47.0 | 100 | 5.7 | 740 | >5 |
| 4 | 48.0 | 130 | 5.4 | 230 | >5 |
| 5 | 49.9 | 11000 | 4.8 | 830 | >5 |
| 6 | 49.9 | 380 | 5.1 | 240 | >5 |
| 7 | 48.9 | 670 | 5.1 | 230 | >5 |
| 8 | 49.7 | 406 | 4.9 | 200 | 3 |
| 9 | 50.8 | 130 | 4.7 | 220 | 3 |
| 10 | 50.6 | 610 | 3.7 | 350 | 4 |
| E | 49.1 | 170 | 5.0 | 170 | <1 |
| 11 | 52.2 | 190 | 4.9 | 320 | >5 |
| 12 | 50.0 | 20 | 5.5 | 590 | >5 |
| F | 45.4 | 400 | 5.4 | 210 | <3 |
| 13 | 45.1 | 80 | 5.9 | 230 | N.D. |
| G | Sedimentated | | | | |
| 14 | 49.7 | 180 | 4.7 | 280 | N.D. |
| 15 | 52.3 | 70 | 4.8 | 480 | N.D. |
| H | Coagulated | | | | |
| 16 | 44.9 | 60 | 6.4 | 215 | N.D. |
| 17 | 44.3 | 40 | 6.2 | 170 | N.D. |
| 18 | 46.2 | 90 | 6.0 | 345 | N.D. |

[1]Number average particle size, determined with a Joyce Loebl disc centrifuge.
[2]Shear stability is determined with a Waring Blender during 5 minutes at high speed, the figures indicate when coagulation occurs.
[3]N.D. is the abbreviation for not determined.

Solids content was determined gravimetrically by weighing an amount of latex, drying this amount at 120° C., reweighing the dried amount, and then dividing the dry weight by the wet weight. Grit content was determined as the fraction larger than 200#, by sieving a weighed amount of latex over a 200# sieve. Film properties were measured on latex films with a wet thickness of 200 micrometers (μm) on glass substrate for the waterspot tests and on Leneta sheets for film gloss determination. Latex films were both dried at 20° C. and at 45° C. Film gloss was measured with a Byk gloss head at an angle of 60°.

Water resistance was measured by placing a few drops of water on the films. After 5 minutes, the appearance of the films was judged. The valuation was as follows:

10 clear 8 slight cloudy 6 cloudy 4 milky 2 white 0 film re-emulsifies

The particle size distribution was determined with a Joyce Loebl disc centrifuge.

Example 19

Pigment Volume Concentration (PVC) 65 Paint Made of Vinyl Acetate-Butyl Acrylate Latex Stabilized With Surfactants and Low Molecular weight HMHEC This Example illustrates that a protective colloid stabilized latex with the discontinuous polymer phase characterized by a small particle size—in this instance, approximately 200 nanometers—exhibits excellent properties in that paint

TABLE 2

| Example | Viscosity[1] mPa · s | Film Gloss (%) FDT 20° C.–45° C. | | Film Waterspot[2] FDT 20° C.–45° C. | | MFT[3] (°C.) |
|---|---|---|---|---|---|---|
| 1 | 200 | 78 | 82 | 8 | 9 | N.D. |
| A | Coagulated | | | | | |
| B | 20 | 25 | 61 | 9 | 9 | N.D. |
| C | 480 | 63 | 65 | 10 | 10 | N.D. |
| 2 | 1050 | 76 | 90 | 8 | 9 | N.D. |
| D | Coagulated | | | | | |
| 3 | 3000 | 79 | 84 | 8 | 9 | N.D. |
| 4 | 940 | 49 | 89 | 9 | 9 | N.D. |
| 5 | 40 | 73 | 79 | 4 | 4 | N.D. |
| 6 | 2625 | 79 | 82 | 9 | 9 | N.D. |
| 7 | 680 | 78 | 80 | 9 | 9 | N.D. |
| 8 | 365 | 79 | 81 | 9 | 9 | N.D. |
| 9 | 485 | 80 | 81 | 9 | 9 | N.D. |
| 10 | 960 | 81 | 81 | 10 | 10 | N.D. |
| E | 50 | 80 | 81 | 10 | 9 | N.D. |
| 11 | 90 | 77 | 82 | 6 | 8 | N.D. |
| 12 | 50 | 79 | 82 | 8 | 9 | N.D. |
| F | 30 | 76 | 82 | 10 | 10 | N.D. |
| 13 | 600 | 83 | 83 | 9 | 9 | <0 |
| G | Sedimentated | | | | | |
| 14 | 2325 | 81 | 82 | 9 | 9 | <0 |
| 15 | 420 | 77 | 83 | 8 | 9 | 11 |
| H | Coagulated | | | | | |
| 16 | 2100 | 82 | 82 | 9 | 9 | 12 |
| 17 | 1200 | 81 | 81 | 9 | 9 | N.D. |
| 18 | 20 | 30 | 33 | 9 | 9 | N.D. |

[1]Brookfield viscosity at 25° C., 20 rpm.
[2]FDT is the abbreviation for film drying temperature.
[3]MFT is minimum film formation temperature.
[4]N.D. is the abbreviation for not determined.

because of the good film forming capacity. By having such a fine particle size, paints can be formulated toward higher filled systems.

The latex of Example 9 was used in a PVC 65 paint as shown in Table 3.

Comparative Example I

PVC 65 Paint Made of Vinyl Acetate-VeoVa Commercial Latexes (Mowilith DM 21)

A commercial latex (Mowilith DM 21) was used in a PVC 65 formulation, also as shown in Table 3. The paint was stabilized with surfactants and Natrosol Plus low molecular weight HMHEC.

Example 20

PVC 80 Paint Made of Vinyl Acetate-Butyl Acrylate Latex Stabilized With Surfactants and Low Molecular Weight HMHEC

The latex of Example 9 was used in a PVC 80 paint as shown in Table 3.

Example 21

PVC 80 Paint Made of Styrene-Acrylate Latex Stabilized with Surfactants and Low Molecular Weight CMC

The latex as described in Example 4—with the exception that 33 grams (instead of 16.6 grams) of Ambergum® 3021 solution were used as protective colloid—functioned as the latex in a PVC 80 paint, also as shown in Table 3.

Comparative Example J

PVC 80 Paint Made of a Commercial Styrene-Acrylate Latex (Acronal 290 D)

A commercial latex (Acronal 290 D) was used in a PVC 80 formulation, also as shown in Table 3.

Example 22

PVC 15 Paint Made of an Acrylic Latex Stabilized With Low Molecular weight CMC

The latex as described in Example 1 was used in a PVC 15 high gloss paint, as shown in Table 3.

Comparative Example K

PVC 15 Paint Made of a Commercial Acrylic Latex (Primal AC 507)

A commercial latex (Primal AC 507) was used in a PVC 15 formulation, also as shown in Table 3.

Properties of the paints of Examples 19–21 and Comparative Examples J and K are set forth in Tables 4 and 5.

As to the thickeners shown in Tables 4 and 5, Natrosol MBR and Natrosol HBR serve as nonassociative thickeners, and Natrosol Plus and Primal RM8 as associative thickeners. Natrosol MBR and Natrosol HBR, like Natrosol Plus, are marketed by Hercules Incorporated, Wilmington, Del.; Primal RM8 is marketed by Rohm & Haas of Philadelphia, Pa.

TABLE 3

Paint Formulations

| Ingredient | PVC 65 (grams) | PVC 80 (grams) | PVC 15 (grams) |
|---|---|---|---|
| Water | 197.0 | 230.0 | 49.7 |
| Calgon N | 1.0 | 1.5 | 2.02 |
| Pigment Verteiler A | 2.0 | 3.0 | — |
| Tamol 731 | — | — | 0.69 |
| CA 24 | 2.0 | 3.0 | 0.51 |
| Agitan 280 | 1.0 | 5.0 | 1.0 |
| Thickener | by demand | by demand | by demand |
| Ammonia (25%) | 0.4 | — | — |
| Kronos RN57 | 159.0 | 198.0 | 210.9 |
| Omyalite 90 | 114.0 | 140.0 | — |
| Durcal 5 | 159.0 | 198.0 | — |
| Talcum AT 200 | 23.0 | 28.0 | — |
| Latex | 167.0 | 93.0 | 671.9 |
| Butyl glycol | 15.0 | 20.0 | — |
| Texanol | 4.0 | 5.0 | 12.1 |
| Agitan 280 | 0.6 | — | — |
| Water | 150 | 71.5 | 52.1 |
| Total | 1000 | 1000 | 1000 |

TABLE 4

Paint Properties of Paints Made From Low Molecular Weight Cellulose Ether Stabilized Lattices

| Example | Thickener | Wt % Thickener | Stormer Viscosity (KU) | ICI Viscosity (mPa · s) | Levelling (leneta[1]) |
|---|---|---|---|---|---|
| 19 | Natrosol Plus | 0.52 | 123 | 110 | 5 |
| 19 | Natrosol MBR | 0.51 | 102 | 110 | 7 |
| I | Natrosol Plus | 0.50 | 100 | 110 | 5 |
| I | Natrosol MBR | 0.50 | 104 | 110 | 5 |
| 20 | Natrosol Plus | 0.33 | 120 | 90 | 3 |
| 20 | Natrosol HBR | 0.31 | 112 | 100 | 3 |
| 21 | Natrosol Plus | 0.40 | 128 | 90 | 1 |
| 21 | Natrosol HBR | 0.32 | 112 | 120 | 4 |
| J | Natrosol Plus | 0.43 | 109 | 110 | 3 |
| J | Natrosol HBR | 0.36 | 104 | 120 | 3 |
| 22 | Natrosol Plus | 0.11 | 96 | 100 | 5 |

TABLE 4-continued

Paint Properties of Paints Made From Low Molecular Weight Cellulose Ether Stabilized Lattices

| Example | Thickener | Wt % Thickener | Stormer Viscosity (KU) | ICI Viscosity (mPa · s) | Levelling (leneta[1]) |
|---------|-----------|----------------|------------------------|-------------------------|----------------------|
| 22 | Natrosol HBR | 0.23 | 96 | 120 | 4 |
| K | Primal RM8 | 0.03 | 95 | 100 | 5 |
| K | Natrosol HBR | 0.24 | 94 | 98 | 2 |

[1]Rating 1–10, 10 = best.

TABLE 5

| Example | Thickener | Spatter Resistance[1] | Scrub Resistance[2] (cycles) | Gloss |
|---------|-----------|-----------------------|------------------------------|-------|
| 19 | Natrosol Plus | 6 | >10000 | — |
| 19 | Natrosol MBR | 2 | >10000 | — |
| I | Natrosol Plus | 7 | 2300 | — |
| I | Natrosol MBR | 2 | 2000 | — |
| 20 | Natrosol Plus | 7 | 940 | — |
| 20 | Natrosol HBR | 2 | 850 | — |
| 21 | Natrosol Plus | 7 | 1010 | — |
| 21 | Natrosol HBR | 2 | 940 | — |
| J | Natrosol Plus | 7 | — | — |
| J | Natrosol HBR | 2 | — | — |
| 22 | Natrosol Plus | — | — | 59 |
| 22 | Natrosol HBR | — | — | 59 |
| K | Primal RM8 | — | — | 63 |
| K | Natrosol HBR | — | — | 71 |

[1]Rating 1–10, 10 = best.
[2]DIN 53778.

Example 23

A solvent free latex flat paint was prepared from the following ingredients, including—as indicated—the latex of Example 13.

| Ingredients | Amounts (grams) |
|-------------|-----------------|
| Water | 197 |
| Calgon N | 1.0 |
| Pigmentverteiler A | 2.0 |
| CA 24 | 2.0 |
| Agitan 280 | 1.6 |
| Natrosol 250 MBR | 5.0 |
| Ammonia (25%) | 0.4 |
| Kronos RN 57 | 159 |
| Omyalite 90 | 114 |
| Durcal 5 | 159 |
| Talcum AT200 | 23 |
| Latex (from Example 13) | 167 |
| Water | 150 |

Properties of the paint of Example 23 are set forth in Table 6.

TABLE 6

| Paint Evaluation in Solvent Free Paint | |
|---|---|
| Thickening Efficiency Natrosol 250 MBR | 0.57% |
| Stormer Viscosity (KU) | 103 |
| ICI Viscosity | 90 |

Finally, although the invention has been described with reference to particular means, materials, and embodiments, it should be noted that the invention is not limited to the particulars disclosed, and extends to all equivalents within the scope of the claims.

What is claimed is:

1. In a process for preparing a latex system that has a tendency to flocculate because of grafting, the improvement comprising aqueous emulsion polymerizing of at least one ethylenically unsaturated monomer selected from the group consisting of acrylic acid, methacrylic acid, butyl acrylate, methyl methacrylate, acrylic esters, styrene, vinyl ethers, vinyl, vinylidene halides, N-vinyl pyrrolidone, ethylene, $C_3$ or greater alpha-olefins, allyl amines, allyl esters of saturated monocarboxylic acids and amides thereof, propylene, 1-butene, 1-pentene, 1-hexene, 1-decene, allyl amines, allyl acetate, allyl propionate, allyl lactate, their amides, and mixtures thereof, in the presence of an amount effective for stabilizing the latex system, of a water soluble protective colloid with a weight average molecular weight of less than about 75,000, selected from the group consisting of carboxymethylcellulose and derivatives thereof having a carboxyl degree of substitution lower limit of about 0.7, hydroxyethylcellulose, ethyl hydroxyethylcellulose, methylcellulose, methyl hydroxypropylcellulose, hydroxypropylcellulose, poly(acrylic acid) and alkali metal salts thereof, ethoxylated starch derivatives, sodium and other alkali metal polyacrylates, water soluble starch glue, gelatin, water soluble alginates, casein, agar, natural and synthetic gums, partially and fully hydrolyzed poly(vinyl alcohol), polyacrylamide, poly(vinyl pyrrolidone), poly(methyl vinyl ether-maleic anhydride), gelatin, and casein.

2. The process of claim 1, wherein from about 0.01 to about 4.0%, by weight based on the total ethylenically unsaturated monomer content, of a surfactant is also present.

3. The process of claim 2, wherein the surfactant comprises a member selected from the group consisting of anionic, cationic, nonionic, and amphoteric surfactants, and mixtures thereof.

4. The process of claim 3, wherein the surfactant comprises a member selected from the group consisting of polyglycol ethers, sulfonated paraffin hydrocarbons, higher alkyl sulfates, alkali metal salts of fatty acids, sulfuric acid esters of fatty alcohols, ethoxylated $C_{4-12}$ alkyl phenols and their sulfonation products, ethoxylated $C_{4-12}$ alkanols and their sulfonation products, and sulfosuccinic acid esters and mixtures thereof.

5. The process of claim 4, wherein the surfactant comprises a member selected from the group consisting of nonylphenol ethoxylate with 4–50 ethylene oxide units, sodium dioctylsulfosuccinate, lauryl sulfate, sodium stearate, sodium oleate, and mixtures thereof.

6. The process of claim 1, wherein the protective colloid comprises a member selected from the group consisting of hydroxyethylcellulose, ethyl hydroxyethylcellulose, carboxymethylcellulose having a carboxyl degree of substitution lower limit of about 0.7, methylcellulose, methyl hydroxypropylcellulose, hydroxypropylcellulose, ethoxylated starch derivatives, partially and fully hydrolyzed poly (vinyl alcohol), poly(acrylic acid), sodium and other alkali metal polyacrylates, polyacrylamide, poly(methyl vinyl ether-maleic anhydride), poly(vinyl pyrrolidone), water soluble starch glue, gelatin, water soluble alginates, casein, agar and natural and synthetic gums.

7. The process of claim 1, wherein the protective colloid has a molecular weight upper limit of about 50,000.

8. The process of claim 1, wherein the protective colloid has a molecular weight upper limit of about 20,000.

9. The process of claim 1, wherein the protective colloid comprises a cellulose ether selected from the group consisting of hydroxyethylcellulose, ethylhydroxyethylcellulose, carboxymethylcellulose having a carboxyl degree of substitution lower limit of about 0.7, methylcellulose, methylhydroxypropylcellulose, and hydroxypropylcellulose.

10. The process of claim 9, wherein the cellulose ether comprises carboxymethylcellulose with a carboxyl degree of substitution of about 0.7–2.9.

11. The process of claim 10, wherein the cellulose ether comprises hydroxyethylcellulose with a hydroxyethyl molar substitution upper limit of 4.0.

12. The process of claim 11, wherein the hydroxyethylcellulose has a hydroxyethyl molar substitution lower limit of about 1.6.

13. The process of claim 1, wherein the protective colloid comprises a hydrophobically modified cellulose ether, the hydrophobe being a hydrocarbon having 4–25 carbons in an amount by weight of the hydrophobically modified cellulose ether from about 0.1% to about 3%.

14. The process of claim 13, wherein the hydrophobically modified cellulose ether comprises a hydrophobically modified hydroxyethylcellulose.

15. The process of claim 14, wherein the hydrophobically modified hydroxyethylcellulose has a hydroxyethyl molar substitution upper limit of about 4.0.

16. The process of claim 15, wherein the hydrophobically modified hydroxyethylcellulose has a hydroxyethyl molar substitution lower limit of about 2.9.

17. The process of claim 1, wherein an initiator is present and comprises a member selected from the group consisting of water soluble peroxides, persulfates, and perborates.

18. The process of claim 17, wherein the initiator comprises a member selected from the group consisting of hydrogen peroxide, potassium, sodium and ammonium persulfates, and sodium perborate.

19. The process of claim 1, in which the polymerization is performed semi-continuously with between about 0% and about 60% of the total amount of an initiator and from about 0% to about 40% of the total amount of the at least one ethylenically unsaturated monomer being added at the beginning of the reaction.

20. The process of claim 1, in which the polymerization is performed continuously.

21. The process of claim 1, in which the polymerization is performed in a "loop" reactor.

22. In a process for preparing a latex system that has a tendency to flocculate because of grafting, the improvement comprising aqueous emulsion polymerizing of at least one ethylenically unsaturated monomer, in the presence of an amount effective for stabilizing the latex system, of a water soluble protective colloid with a weight average molecular weight of less than about 75,000, selected from the group consisting of hydroxyethylcellulose, ethyl hydroxyethylcellulose, methylcellulose, methyl hydroxypropylcellulose, hydroxypropylcellulose, ethoxylated starch derivatives, partially and fully hydrolyzed poly (vinyl alcohol), poly(acrylic acid), sodium and other alkali metal polyacrylates, polyacrylamide, poly(methyl vinyl ether-maleic anhydride), poly(vinyl pyrrolidone), water soluble starch glue, gelatin, water soluble alginates, casein, agar and natural and synthetic gums and derivatives thereof, poly(acrylic acid) and alkali metal salts thereof, partially and fully hydrolyzed poly(vinyl alcohol), polyacrylamide, poly (vinyl pyrrolidone), poly(methyl vinyl ether-maleic anhydride), gelatin, and casein.

23. The process of claim 22, wherein from about 0.01 to about 4.0%, by weight based the total ethylenically unsaturated monomer content, of a surfactant is also present.

24. The process of claim 23, wherein the surfactant comprises a member selected from the group consisting of anionic, cationic, nonionic, and amphoteric surfactants, and mixtures thereof.

25. The process of claim 24, wherein the surfactant comprises a member selected from the group consisting of polyglycol ethers, sulfonated paraffin hydrocarbons, higher alkyl sulfates, alkali metal salts of fatty acids, sulfuric acid esters of fatty alcohols, ethoxylated $C_{4-12}$ alkyl phenols and their sulfonation products, ethoxylated $C_{4-12}$ alkanols and their sulfonation products, and sulfosuccinic acid esters and mixtures thereof.

26. The process of claim 25, wherein the surfactant comprises a member selected from the group consisting of nonylphenol ethoxylate with 4–50 ethylene oxide units, sodium dioctylsulfosuccinate, lauryl sulfate, sodium stearate, sodium oleate, and mixtures thereof.

27. The process of claim 22, wherein the at least one ethylenically unsaturated monomer comprises a member selected from the group consisting of acrylic acid, methacrylic acid, butyl acrylate, methyl methacrylate, acrylic esters, and styrene, and mixtures thereof.

28. The process of claim 22, wherein the at least one ethylenically unsaturated monomer comprises a member selected from the group consisting of vinyl esters, vinyl ethers, vinyl, vinylidene halides, N-vinyl pyrrolidone, ethylene, $C_3$ or greater alpha-olefins, allyl amines, allyl esters of saturated monocarboxylic acids and amides thereof, and mixtures thereof.

29. The process of claim 22, wherein the protective colloid has a molecular weight upper limit of about 50,000.

30. The process of claim 22, wherein the protective colloid has a molecular weight upper limit of about 20,000.

31. The process of claim 22, wherein the protective colloid comprises a cellulose ether selected from the group consisting of hydroxyethylcellulose, ethylhydroxyethylcellulose, methylcellulose, methylhydroxypropylcellulose, and hydroxypropylcellulose.

32. The process of claim 31, wherein the cellulose ether comprises hydroxyethylcellulose with a hydroxyethyl molar substitution upper limit of 4.0.

33. The process of claim 32, wherein the hydroxyethylcellulose has a hydroxyethyl molar substitution lower limit of about 1.6.

34. The process of claim 22, wherein the protective colloid comprises a hydrophobically modified cellulose ether, the hydrophobe being a hydrocarbon having 4–25 carbons in an amount by weight of the hydrophobically modified cellulose ether from about 0.1% to about 3%.

35. The process of claim 34, wherein the hydrophobically modified cellulose ether comprises a hydrophobically modified hydroxyethylcellulose.

36. The process of claim 35, wherein the hydrophobically modified hydroxyethylcellulose has a hydroxyethyl molar substitution upper limit of about 4.0.

37. The process of claim 36, wherein the hydrophobically modified hydroxyethylcellulose has a hydroxyethyl molar substitution lower limit of about 2.9.

38. The process of claim 22, wherein an initiator is present and comprises a member selected from the group consisting of water soluble peroxides, persulfates, and perborates.

39. The process of claim 38, wherein the initiator comprises a member selected from the group consisting of hydrogen peroxide, potassium, sodium and ammonium persulfates, and sodium perborate.

40. The process of claim 22, in which the polymerization is performed semi-continuously with between about 0% and 60% of the total amount of an initiator and from about 0% to about 40% of the total amount of the at least one ethylenically unsaturated monomer being added at the beginning of the reaction.

41. The process of claim 22, in which the polymerization is performed continuously.

42. The process of claim 22, in which the polymerization is performed in a "loop" reactor.

43. In a latex system that has a tendency to flocculate because of grafting, the improvement comprising:

an aqueous emulsion comprising:
(a) a polymer of at least one ethylenically unsaturated monomer selected from the group consisting of acrylic acid, methacrylic acid, butyl acrylate, methyl methacrylate, acrylic esters, styrene, vinyl ethers, vinyl, vinylidene halides, N-vinyl pyrrolidone, ethylene, $C_3$ or greater alpha-olefins, allyl amines, allyl esters of saturated monocarboxylic acids and amides thereof, propylene, 1-butene, 1-pentene, 1-hexene, 1-decene, allyl amines, allyl acetate, allyl propionate, allyl lactate, their amides, and mixtures thereof; and
(b) an amount effective for stabilizing the latex system, of a water soluble protective colloid with a weight average molecular weight of less than about 75,000, selected from the group consisting of carboxymethylcellulose and derivatives thereof having a carboxyl degree of substitution lower limit of about 0.7, hydroxyethylcellulose, ethyl hydroxyethylcellulose, methylcellulose, methyl hydroxypropylcellulose, hydroxypropylcellulose, poly(acrylic acid) and alkali metal salts thereof, ethoxylated starch derivatives, sodium and other alkali metal polyacrylates, water soluble starch glue, gelatin, water soluble alginates, casein, agar, natural and synthetic gums, partially and fully hydrolyzed poly (vinyl alcohol), polyacrylamide, poly(vinyl pyrrolidone), poly(methyl vinyl ether-maleic anhydride), gelatin, and casein.

44. The latex system of claim 43, the polymer having been polymerized by aqueous emulsion polymerization in the presence of the water soluble protective colloid.

45. The latex system of claim 43, further comprising from about 0.01 to about 4.0%, by weight based on the total ethylenically unsaturated monomer content, of a surfactant.

46. The latex system of claim 43, wherein the protective colloid has a molecular weight upper limit of about 50,000.

47. The latex system of claim 43, wherein the polymer comprises a discontinuous phase characterized by an average particle size of less than about 300 nanometers.

48. A latex paint composition comprising:
(a) at least one member selected from the group consisting of a pigment and an extender; and
(b) the latex system of claim 43.

49. The latex paint composition of claim 48, wherein the latex is solvent free.

50. The latex paint composition of claim 48, wherein the polymer comprises particles having an average size of less than about 500 nanometers.

51. The latex paint composition of claim 48, wherein the paint is a gloss paint with a pigment volume concentration of less than about 50.

52. The latex paint composition of claim 48, wherein the paint is a flat paint with a pigment volume concentration of about 50 or greater.

53. A water-based ink composition comprising the latex system of claim 43 and at least one other ink ingredient.

54. A paper coating composition comprising the latex system of claim 43 and at least one other paper coating composition ingredient.

55. A dextrin free adhesive composition comprising the latex of claim 43 and at least one other non-dextrin containing adhesive ingredient.

56. A binder for non-woven materials comprising the latex of claim 43 and at least one other binder ingredient.

57. In a latex system that has a tendency to flocculate because of grafting, the improvement comprising:

an aqueous emulsion comprising:
(a) a polymer of at least one ethylenically unsaturated monomer; and
(b) an amount effective for stabilizing the latex system, of a water soluble protective colloid with a weight average molecular weight of less than about 75,000, selected from the group consisting of hydroxyethylcellulose, ethyl hydroxyethylcellulose, methylcellulose, methyl hydroxypropylcellulose, hydroxypropylcellulose, ethoxylated starch derivatives, partially and fully hydrolyzed poly(vinyl alcohol), poly(acrylic acid), sodium and other alkali metal polyacrylates, polyacrylamide, poly(methyl vinyl ether-maleic anhydride), poly(vinyl pyrrolidone), water soluble starch glue, gelatin, water soluble alginates, casein, agar and natural and synthetic gums and derivatives thereof, poly(acrylic acid) and alkali metal salts thereof, partially and fully hydrolyzed poly(vinyl alcohol), polyacrylamide, poly(vinyl pyrrolidone), poly (methyl vinyl ether-maleic anhydride), gelatin, and casein.

58. The latex system of claim 57, the polymer having been polymerized by aqueous emulsion polymerization, in the presence of the water soluble protective colloid.

59. The latex system of claim 57, further comprising from about 0.01 to about 4.0%, by weight based on the total ethylenically unsaturated monomer content, of a surfactant.

60. The latex system of claim 57, wherein the protective colloid has a molecular weight upper limit of about 50,000.

61. The latex system of claim 57, wherein the at least one ethylenically unsaturated monomer comprises a member selected from the group consisting of acrylic acid, methacrylic acid, butyl acrylate, methyl methacrylate, acrylic esters, styrene, and mixtures thereof.

62. The latex system of claim 57, wherein the at least one ethylenically unsaturated monomer comprises a member selected from the group consisting of vinyl esters, vinyl ethers, vinyl, vinylidene halides, N-vinyl pyrrolidone, ethylene, $C_3$ or greater alpha-olefins, allyl amines, allyl esters of saturated monocarboxylic acids and amides thereof, and mixtures thereof.

63. The latex system of claim 57, wherein the protective colloid has a molecular weight upper limit of about 20,000.

* * * * *